(12) United States Patent
Friese (10) Patent No.: US 10,843,950 B2
(45) Date of Patent: Nov. 24, 2020

(54) PIPING MANIFOLD FOR PULSATING FLOW

(71) Applicant: APTwater, LLC, Pittsburg, CA (US)

(72) Inventor: David D. Friese, Pittsburg, CA (US)

(73) Assignee: APTwater, LLC, Pittsburg, CA (US)

( * ) Notice: Subject to any disclaimer, the term of this patent is extended or adjusted under 35 U.S.C. 154(b) by 35 days.

(21) Appl. No.: 16/046,915

(22) Filed: Jul. 26, 2018

(65) Prior Publication Data

US 2020/0031696 A1   Jan. 30, 2020

(51) Int. Cl.
| | |
|---|---|
| *C02F 1/00* | (2006.01) |
| *C02F 3/10* | (2006.01) |
| *G05D 7/06* | (2006.01) |
| *B05B 1/08* | (2006.01) |
| *B05B 1/20* | (2006.01) |
| *C02F 3/12* | (2006.01) |
| *C02F 3/02* | (2006.01) |
| *C02F 101/16* | (2006.01) |

(52) U.S. Cl.
CPC ............ *C02F 3/1268* (2013.01); *B05B 1/083* (2013.01); *B05B 1/20* (2013.01); *C02F 1/006* (2013.01); *C02F 3/025* (2013.01); *C02F 3/102* (2013.01); *G05D 7/0664* (2013.01); *C02F 2101/16* (2013.01); *C02F 2301/026* (2013.01)

(58) Field of Classification Search
CPC ........ C02F 3/1268; C02F 3/102; C02F 3/025; C02F 1/006; C02F 2101/16; G05D 7/0664
USPC ....................................................... 210/615
See application file for complete search history.

(56) References Cited

U.S. PATENT DOCUMENTS 4,027,407 A * 6/1977 Kiss ..................... B63H 11/12
                                                     37/321
6,632,356 B2 * 10/2003 Hallan ................ B01D 63/106
                                                     210/321.6
(Continued)

FOREIGN PATENT DOCUMENTS

CN    203990982 U    12/2014
CN    106957107 A     7/2017
(Continued)

OTHER PUBLICATIONS

International Search Report from International Application No. PCT/US2019/043493, 6 pages, dated Oct. 30, 2019.

*Primary Examiner* — Nam X Nguyen
*Assistant Examiner* — Julia L. Wun
(74) *Attorney, Agent, or Firm* — McDermott, Will & Emery LLP; Judy M. Mohr; Ricardo J. Claps (57) ABSTRACT

A disclosed piping manifold for providing pulsating flow includes an outer tubular member extending along a longitudinal axis. The outer tubular member includes a plurality of outer radial openings. An inner tubular member is positionable within the outer tubular member and rotatable about the longitudinal axis. The inner tubular member includes a plurality of inner radial openings, an inlet port configured to receive a fluid, and a lumen providing a fluidic pathway between the plurality of inner radial openings and the inlet port. Rotation of the inner tubular member about the longitudinal axis is configured to periodically bring the plurality of inner radial openings in and out of registration with the plurality of outer radial openings to provide a plurality of pulsating flows of the fluid out of the outer radial openings.

19 Claims, 8 Drawing Sheets

(56) References Cited

U.S. PATENT DOCUMENTS

| | | |
|---|---|---|
| 7,618,537 B2 | 11/2009 | Bowman |
| 7,815,801 B2 | 10/2010 | Borg et al. |
| 7,931,807 B2 | 4/2011 | Bowman |
| 8,173,020 B2 | 5/2012 | Bowman |
| 8,196,611 B2 | 6/2012 | Witz et al. |
| 8,323,497 B2 | 12/2012 | Borg et al. |
| 8,485,264 B2 | 7/2013 | Hutin et al. |
| 9,557,745 B2 * | 1/2017 | Klitzing ................ F22B 37/228 |
| 9,759,046 B2 | 9/2017 | Sanders |
| 9,902,634 B2 | 2/2018 | Friese et al. |
| 2011/0180474 A1 | 7/2011 | Bowman |
| 2013/0105391 A1 * | 5/2013 | Friese .................... C02F 3/102 |
| | | 210/615 |
| 2018/0051836 A1 * | 2/2018 | Wajnikonis ........... F16L 15/002 |

FOREIGN PATENT DOCUMENTS

| | | |
|---|---|---|
| DE | 4416747 A1 | 11/1995 |
| EP | 2476653 A1 | 7/2012 |

* cited by examiner

PIPING MANIFOLD FOR PULSATING FLOW

TECHNICAL FIELD

Disclosed embodiments relate to industrial systems and processes, and more particularly include a piping manifold system and method for providing pulsating flow to a plurality of biofilm reactors.

BACKGROUND OF THE DISCLOSURE

Industrial processes, such as the production of chemical substances and water treatment, commonly use biofilm reactors to treat or interact with an influent stream of fluid using metabolic processes. Biofilm reactors come in a variety of different types, such as membrane, moving bed, and blanket reactors, and typically include a growth surface for a biofilm containing microorganisms (e.g., bacteria cells) capable of metabolizing contaminants or other substances in an influent stream. During operation, influent liquid or fluid is provided across the biofilm, which interacts with substances in the influent stream for treatment or processing. The efficiency and production capacity of these systems are typically constrained by the ability of the influent to contact the biofilm and the rate of fluid transfer through the system.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In various biological systems, the efficiency of mass transfer and treatment is directly related to the velocity of liquid passing across a biofilm. Increased velocities can create more turbulent flows that improve mixing for increased efficiency. However, more efficient, higher velocities ordinarily create higher total flowrates, and therefore, higher recycle rates. Higher recycle rates may in turn necessitate larger pumps and infrastructure, which drives up both capital and energy costs.

It has been determined that the benefits of increased liquid velocity can be maintained without the downside of increased recycle rates or increased total flow rates by implementing pulsating flow, in which intermittent or periodic increased velocities can be provided to a biofilm reactor system without a need to increase total flow rate over time. A piping manifold implemented as a pipe-in-pipe system can create pulsating flows at relatively low capital and maintenance costs using an inner pipe that rotates independently of an outer pipe. Holes or openings in both pipes can allow for intermittent or pulsating flow out of the openings when the openings of the inner pipe and the openings of the outer pipe align.

Figure 1:
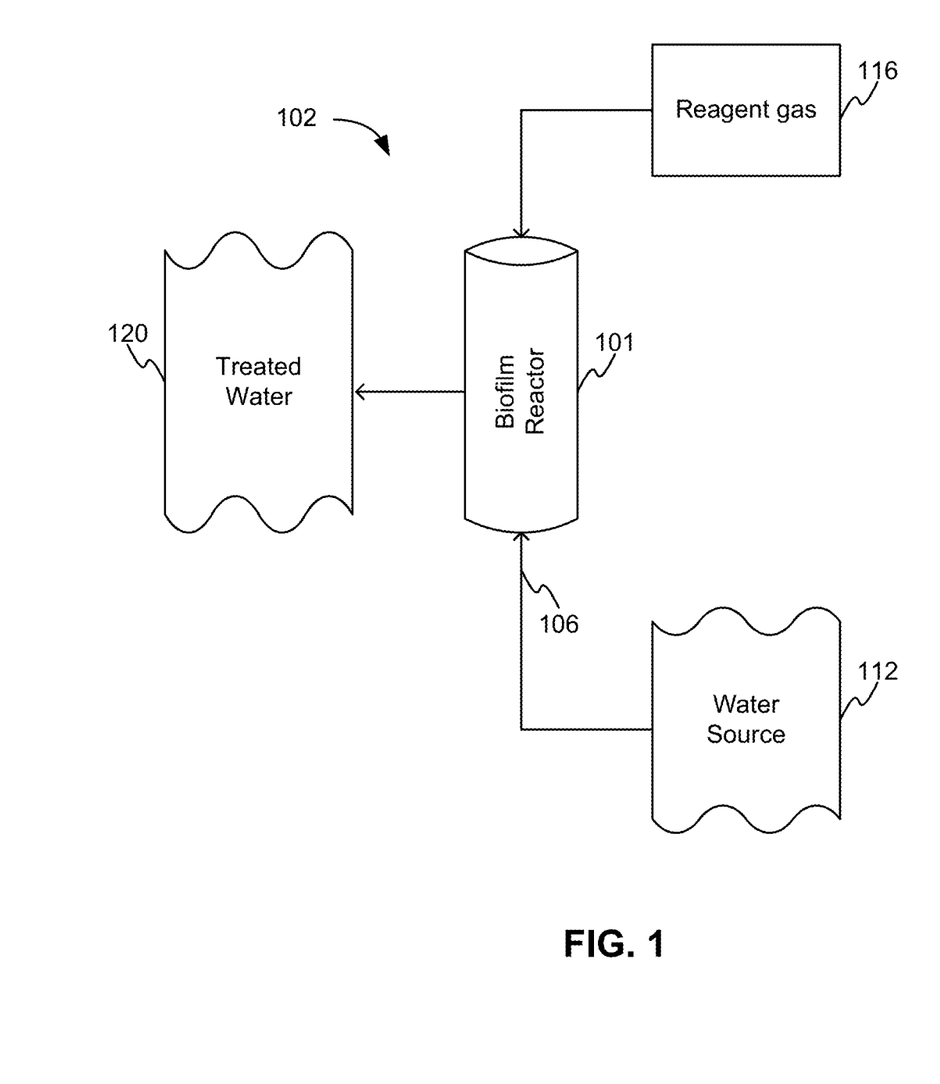
FIG. 1 is a schematic diagram of an example of a biological system employing a biofilm reactor.

FIG. 1 is a schematic diagram of an exemplary biological system 102 employing a biofilm reactor 101. The example biological system 102 is described below with reference to the decontamination of water, but it will be appreciated that in various embodiments, similar principles may be employed for a variety of other applications and processes, which may involve a biofilm or biomass treating or otherwise interacting with water or other liquids or fluids.

Referring to FIG. 1, the biological system 102 includes a biofilm reactor 101, which contains a growth surface for a biofilm containing microorganisms (e.g., bacteria cells) capable of metabolizing contaminants in a stream 106 of contaminated water. Stream 106 is referred to as an "influent" stream for the biofilm reactor 101 because it is flowing into the reactor. As shown in FIG. 1, the influent stream 106 is fed to the biofilm reactor 101 from a water source 112, while a reagent gas 116, such as hydrogen or an oxygen containing gas, is provided to the biofilm reactor 101 to contact the biofilm and support biofilm growth in the reactor 101. When the contaminated water passes across the biofilm, the biofilm metabolizes contaminants to output treated water 120 with harmful contaminants reduced or eliminated. For example, metabolic processes in the biofilm may be used for denitrification or removal of ammonia or various organic compounds. The biofilm reactor 101 may be implemented as any suitable type capable of receiving a stream of fluid and supporting a biofilm, such as, for example, a membrane reactor, moving bed reactor, fluidized bed reactor, blanket reactor, and the like.

The stream 106 may be provided to the biofilm reactor with a constant flow rate that causes the fluid to pass across and mix with the biofilm. Alternatively, the stream 106 may be provided with a time varying flow rate (or velocity) employing an intermittent or otherwise pulsating flow having periods of high and low velocities. This may be useful to, for example, increase efficiency and/or create turbulence that improves mixing between the influent and a biofilm growing in the reactor 10 when compared to a constant flow rate stream. The pulsating flow may alternate between high and low velocities with a regular or irregular pattern or periodicity during operation. The low velocity periods may employ velocities as low as zero, which is equivalent to periodically stopping the flow entirely or making the flow intermittent during operation. Alternatively, the low velocity periods may employ a non-zero velocity that is materially lower than the high velocity or peak velocity periods of the pulsating flow.

Figure 2:
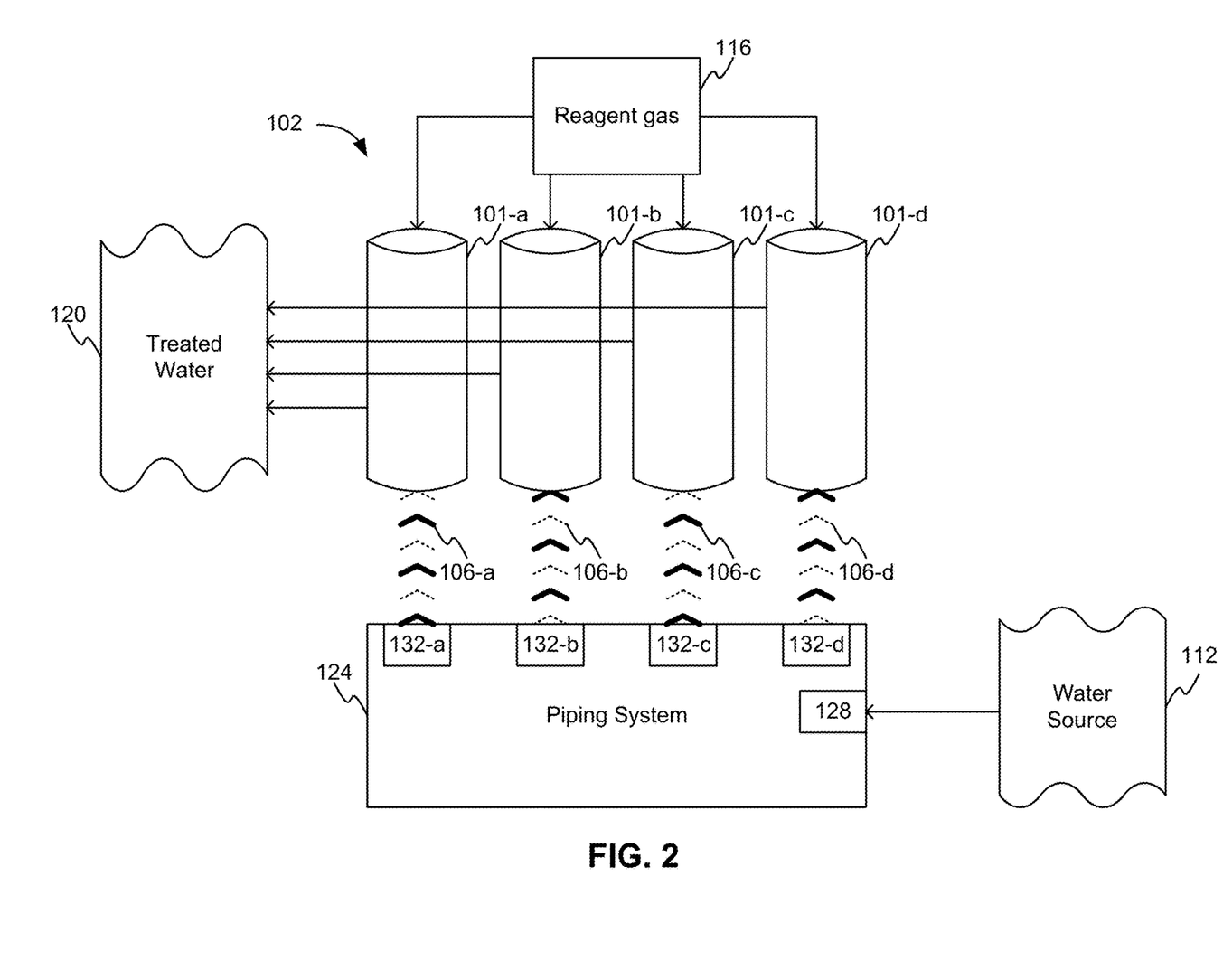
FIG. 2 is a schematic diagram of an example of a biological system employing a plurality of biofilm reactors and pulsating flow.

Referring now to FIG. 2, an implementation of the biological system 102 is depicted including a plurality of biofilm reactors 101 and a piping system 124 configured to deliver pulsating flow. As shown in FIG. 2, the piping system 124 is operatively coupled between the water source 112 and plurality of biofilm reactors 106, and the piping system 124 is configured to provide a plurality of fluid streams 106 to the plurality of biofilm reactors 101. The piping system 124 includes an inlet channel 128 for receiving water from the water source 112 and a plurality of outlet channels 132 for delivering the received water to the plurality of biofilm reactors 101. Although only one inlet channel 128 is depicted for simplicity, it will be appreciated that in various embodiments, multiple inlet channels may be included without departing from principles described herein.

As shown in FIG. 2, each of the outlet channels 132 may provide a respective channel for delivering a respective stream 106 to a corresponding one or more of the biofilm reactors. In particular, four biofilm reactors 101-a through 101-d are depicted, with four corresponding influent streams 106-a through 106-d, but it will be appreciated that in various embodiments, any suitable number of biofilm reactors 101 may be included (e.g., two reactors, ten reactors, twenty reactors, forty reactors, eighty reactors, or more). Further, while the streams 106 are shown with one-to-one correspondence with the biofilm reactors 101, in various embodiments, any one of the streams 106 may be configured to deliver fluid to a plurality of biofilm reactors. For example, while each of the outlets 132 is coupled to a respective one of the biofilm reactors 101 in the example shown in FIG. 2, in other implementations, each of the outlets 132 may be coupled to a respective plurality of biofilm reactors (e.g., a respective set of two reactors, three reactors, four reactors, or more).

The piping system 124 is configured to deliver each of the plurality of streams 106 with a pulsating flow, e.g., in a similar manner to that described above. Further, as shown in FIG. 2, the plurality of streams 106 may be provided with periodic flows having a plurality of different phases in which the high or maximum velocity periods occur at different times relative to each other across two or more of the respective streams 106. In some embodiments, different phases across all of the streams 106 may be synchronized with each other to maintain a substantially constant total flow rate across all of the streams 106, while allowing each individual stream 106 to observe a periodically fluctuating flow rate. For example, in FIG. 2, the pulsating flows of the streams 106 are represented schematically as periodically bolded and dotted arrows in the direction of flow influent to the biofilm reactors 10, corresponding to maximum velocity and minimum velocity periods, respectively. Outlet channel 132-a is configured to provide a respective pulsating stream 106-a to biofilm reactor 101-a, outlet channel, 132-b is configured to provide a respective pulsating stream 106-b to biofilm reactor 101-b, outlet channel 132-c is configured to provide a respective pulsating stream 106-c to biofilm reactor 101-c, and outlet channel 132-d is configured to provide a respective pulsating stream 106-d to biofilm reactor 101-d. The pulsating streams 106-a and 106-c have periodic flow rates at substantially the same phase, but are out-of-phase with pulsating streams 106-b and 106-d. As a result, during times when the streams 106-a and 106-c observe high flow rates (represented by bolded arrows), streams 106-b and 106-d observe low flow rates (represented by dotted arrows), and vice versa. In this regard, the sum of flow rates across all of the streams 106-a through 106-d may be substantially constant over a period of time, while the individual respective flow rates at each of the pulsating streams 106-a through 106-d may be made to pulsate or periodically vary for increased efficiencies in the corresponding biofilm reactors 101 during the same period of time.

The piping system 124 may generally employ any suitable structure or assembly to generate pulsating flows. For example, in some embodiments, the piping system 124 can employ a multitude of automated valves, or individual pumps and Variable Frequency Drives (VFDs), configured to generate the pulsating flows for the pulsating influent stream(s) 106. Additionally or alternatively, the piping system 124 may employ a piping manifold that employs an inner pipe rotating within an outer pipe to intermittently bring corresponding inner and outer openings into and out of registration for providing pulsating streams through the outer openings. This may be useful to, for example, reduce capital or maintenance costs compared to the use of automated valves, or individual pumps and VFDs.

Figures 3, 4, 5:
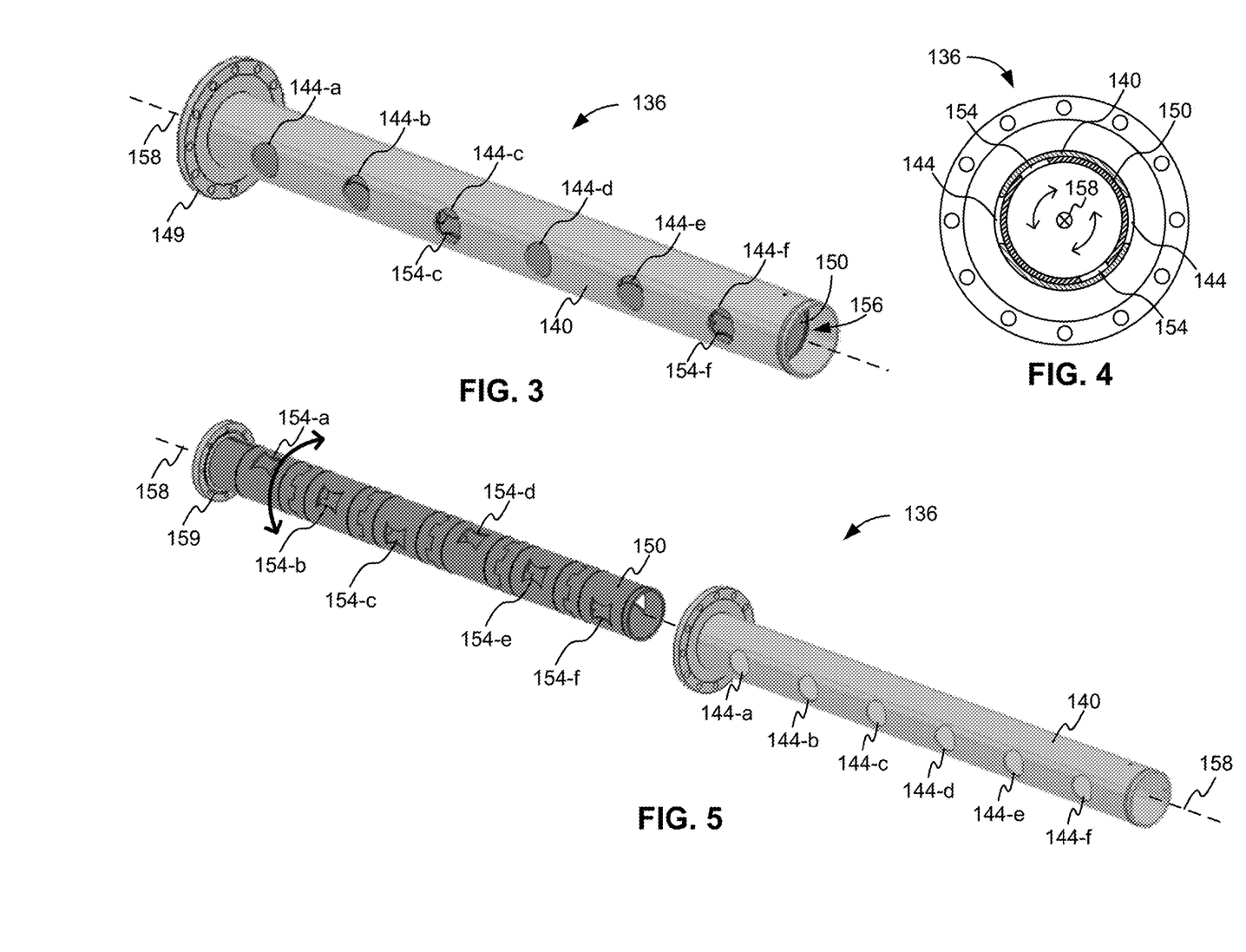
FIG. 3 is an assembled view of an example of a piping manifold.
FIG. 4 is a cross section view of an example of a piping manifold.
FIG. 5 is an exploded view of an example of a piping manifold.

FIGS. 3-5 depict an exemplary piping manifold 136 that may, for example, be implemented in the piping system 124 (FIG. 2). FIG. 3 is a three-dimensional assembled view of the piping manifold 136, while FIG. 4 is a cross section view of the piping manifold 136 from FIG. 3. FIG. 5 is an exploded view of the piping manifold 136 from FIG. 3 showing certain internal components.

As shown in FIGS. 3-5, the piping manifold 136 includes multiple tubular members having respective radial openings that can be brought into and out of registration (or "alignment") through relative rotation between the tubular members. In particular, the piping manifold 136 includes an outer tubular member 140 having a plurality of outer radial openings 144 and an inner tubular member 150 having a plurality of inner radial openings 154. The inner tubular member 150 is rotatably disposed within the outer tubular 140 and configured to rotate independently from the outer tubular member 140 to periodically bring the inner radial openings 154 into and out of registration with the outer radial openings 144.

The inner tubular member 150 includes an inlet port 156 configured to receive a fluid from a fluid source. The inlet port 156 can also be referred to "influent" port because it provides an inlet channel for receiving fluid flowing into the piping manifold 136 that may, for example, be configured in accordance with inlet channel 128 (FIG. 2). As shown in FIG. 3, to provide the inlet port 156, an axial end of the inner tubular member 150 is left open to permit an influent stream of fluid to flow into an inner lumen of the inner tubular member 150. The lumen provides a fluidic pathway between the inlet port 156 and the plurality of inner radial openings 154. It will be appreciated that other more complex structural arrangements of the inlet port 156 are possible, and while one inlet port 156 is shown, in various embodiments multiple inlet ports may be included.

As the outer and inner radial openings 144, 154 are periodically brought into and out of registration, a flow path through the outer radial openings 144 is periodically opened and restricted to create a pulsating outward flow of the fluid received at the inlet port 156. The inner tubular member 150 may be configured to rotate at a constant rotational speed to produce a relatively slow rise and drop in flow rate over time (e.g., similar to a sine wave or triangular wave) as the openings are brought into and out of alignment, respectively. Alternatively, the inner tubular member 150 may be configured to rotate at a varying rotational speed, such as alternating between fast and slow speeds, to produce a more pronounced pulse (e.g., similar to a square wave) as the openings are brought into and out of alignment rapidly. The outer radial openings 144 can be referred to as "effluent" ports of the piping manifold 136 because they may each provide an outlet channel for fluid flowing out of the piping manifold 136. The outer radial openings 144 can each provide an outlet channel that may, for example, be configured in accordance with the outlet channels 132 (FIG. 2) to provide a pulsating fluid flow influent to a biofilm reactor.

Referring to FIGS. 3-5, each of the tubular members 140, 150 is shown as an elongated pipe extending along a longitudinal axis 158 about which the inner pipe may rotate. The outer and inner tubular members 140, 150 each have a respective inner and outer diameter, where the inner tubular member 150 has an outer diameter that is slightly less than the inner diameter of the outer tubular member 140 to permit the inner tubular member 150 to be disposed within a lumen of the outer tubular member 140. The outer and inner tubular members 140, 150 are also shown disposed in a coaxial arrangement, where the longitudinal axis 158 about which the inner tubular member 150 rotates corresponds to the shared cylindrical axis of the coaxial tubular members. This coaxial arrangement may be beneficial, for example, to allow for a uniform gap tolerance in the annular region or interface between the outer and inner tubular members and permit tighter control over fluid flow.

The inner tubular member 150 may be configured to rotate in either or both directions shown by the arrows in FIGS. 4 and 5, and the tubular members may include flanges to facilitate coupling to corresponding fixed or moving references during operation. For example, as shown in FIG. 5, the inner tubular member includes a flange 159 disposed at an opposing axial end opposite to the inlet port 150, and the flange 159 may fixedly couple to a rotating drive shaft (e.g., of a motor) to permit rotation of the inner tubular member 150 with the rotation of the drive shaft. The outer tubular member 140 may include a flange 149 at an axial end thereof that may fixedly couple to a fixed reference (e.g., fixed relative to the earth or relative to a biofilm reactor system).

Each of the radial openings may be configured as an aperture, hole, or other suitable fluidic opening that generally extends through a lateral sidewall of its corresponding tubular member to permit a radially outward flow of fluid through the opening from the internal lumen of the tubular member. For example, the outer radial openings 144 each extend through a lateral sidewall of the outer tubular member 140, and the inner radial openings 154 each extend through a lateral sidewall of the inner tubular member 150. This allows an outward fluidic passage or channel from the piping manifold 136 to be opened at respective outer radial openings that are in registration with corresponding inner radial openings, while an outward fluidic passage is blocked or otherwise restricted at respective outer radial openings that are out of registration with corresponding inner radial openings.

The exemplary arrangement of openings shown in FIGS. 3-5 permits multiple outflow channels to be defined along the length of the piping manifold 136. In this example, twelve outer radial openings 144 and twelve inner radial openings 154 are included, with the twelve outer radial openings 144 and twelve inner radial openings 154 being arranged at a plurality of longitudinal and circumferential positions on their respective tubular members. Outer radial openings 144 are disposed along the outer tubular member 140 at six longitudinal positions (denoted a-f, respectively), and inner radial openings 154 are disposed along the inner tubular member 150 at six longitudinal positions that respectively correspond to the longitudinal positions of the outer radial openings 144. In this regard, the outer openings 144 are positioned in respective longitudinal alignment with the inner radial openings 154, in which outer radial openings 144-*a* are longitudinally aligned with inner radial openings 154-*a*, outer radial openings 144-*b* are longitudinally aligned with inner radial openings 154-*b*, outer radial openings 144-*c* are longitudinally aligned with inner radial openings 154-*c*, outer radial openings 144-*d* are longitudinally aligned with inner radial openings 154-*d*, outer radial openings 144-*e* are longitudinally aligned with inner radial openings 154-*e*, and outer radial openings 144-*f* are longitudinally aligned with inner radial openings 154-*f*.

Each longitudinal position also includes multiple radial openings at multiple circumferential positions (or "angular" positions). This can be more clearly seen in the cross section view of FIG. 4, which shows an example in which each tubular member includes a pair of radial openings arranged at opposing circumferential positions about the tubular member.

The outer radial openings 144-*a* through 144-*f* shown in FIGS. 3 and 5 are arranged in a row, at generally the same circumferential positions about the outer tubular member 140 as each other. In this regard, outer radial openings 144-*a* through 144-*f* are circumferentially or angularly aligned with each other. By contrast, the inner radial openings 154-*a* through 154-*f* are in multiple different circumferential positions in a circumferentially staggered arrangement about the inner tubular member 150. As a result of this staggered arrangement, rotation of the inner tubular member 150 about the longitudinal axis 158 selectively brings the inner radial openings 154 in and out of registration with corresponding ones of the outer radial openings 144 at different times out of phase from one another, depending on their longitudinal positions. For example, FIGS. 3 and 5 show corresponding inner and outer openings at varying exemplary states of registration based on a staggered arrangement, in which openings 144-*a* and 154-*a* are fully out of registration with each other, openings 144-*c* and 154-*c* are fully in registration with each other, and openings 144-*b* and 154-*b* are in partial registration with each other to allow for minimum, maximum, and intermediate flow rates, respectively. It will be appreciated that a similar effect may be achieved with a reverse arrangement in which a plurality of the inner radial openings 154 are circumferentially aligned with each other while a corresponding plurality of the outer radial openings 144 are circumferentially staggered. More generally, pulsating flow with different phases at different channels may be generated by the piping manifold 136 by arranging the inner radial openings 154 at different circumferential positions relative to the inner tubular member 150 than the circumferential positions of the outer radial openings 144 relative to the outer tubular member 140.

Figure 6A:
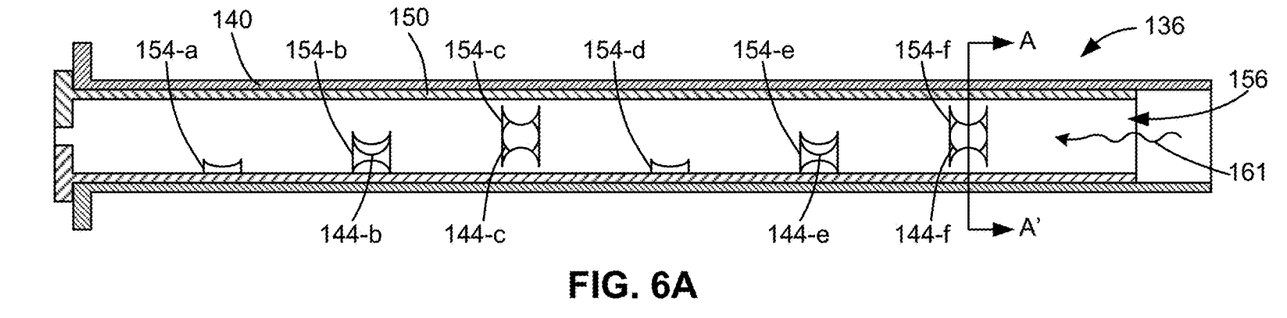
FIGS. 6A-6C are longitudinal section views of an example of a piping manifold at various stages of operation.
Figure 6B:
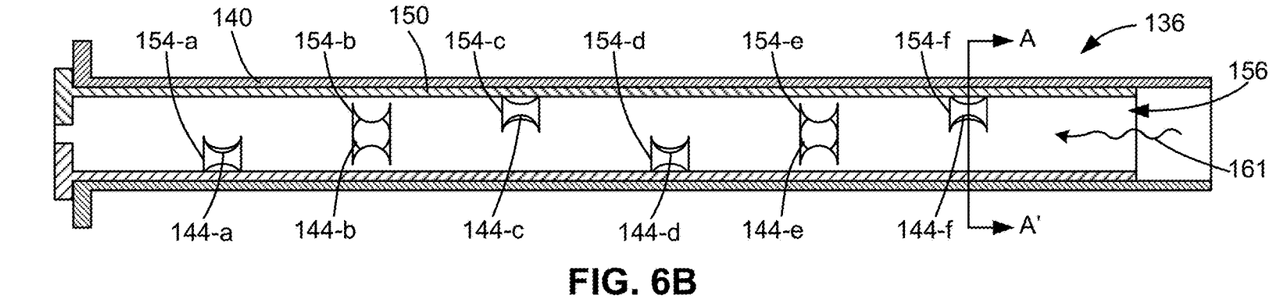
Figure 6C:
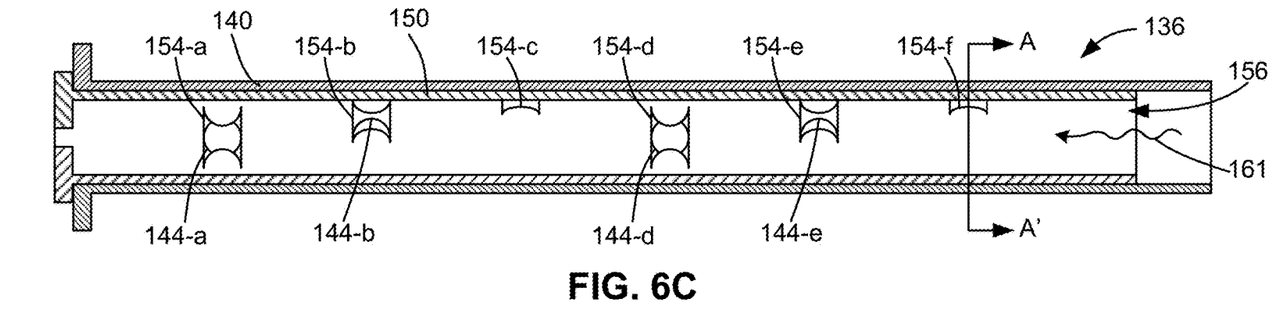
Figure 7A:
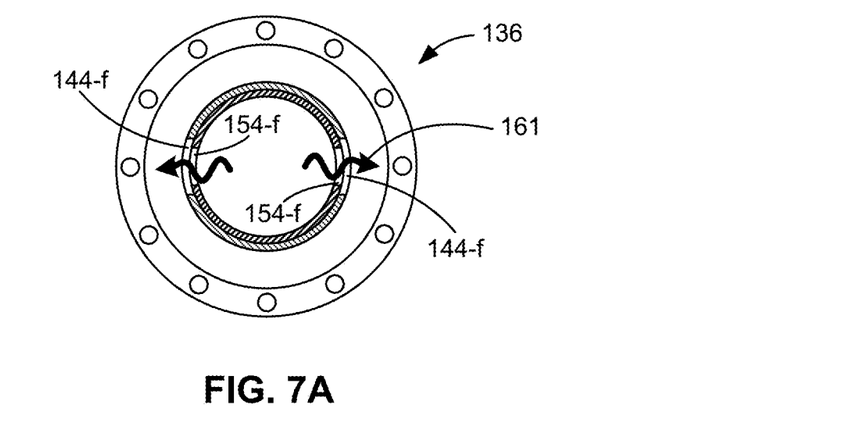
FIGS. 7A-7C are cross section views of an example of a piping manifold at various stages of operation.
Figure 7B:
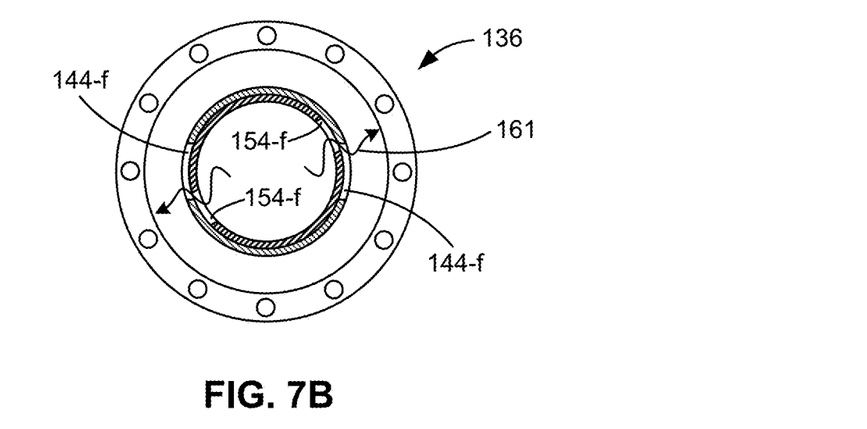
Figure 7C:
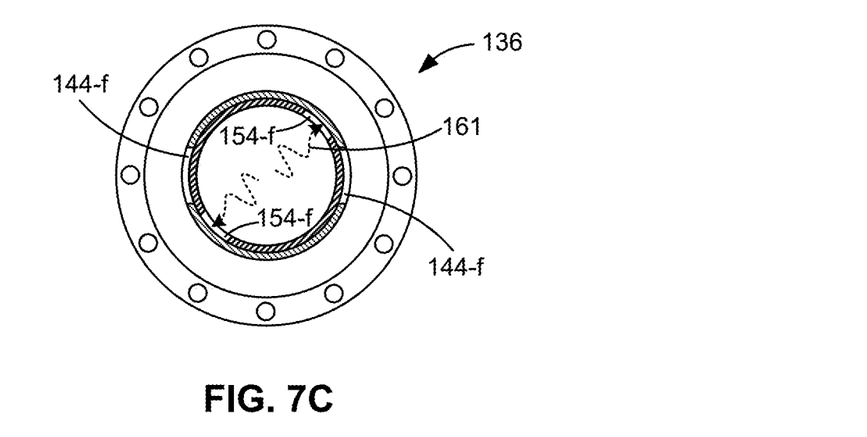

FIGS. 6A-6C are longitudinal section views of an exemplary piping manifold 136 depicting inner tubular member 150 at various stages of rotation to show an example of how a staggered arrangement can generate or facilitate a plurality of pulsating streams of a fluid 161 with a plurality of different phases. FIGS. 7A-7C are cross section views taken along line A-A' in FIGS. 6A-6C to show an example of how rotation of the inner tubular member 150 can periodically permit and restrict radially outward flow from the piping manifold 136 at a set of corresponding openings. The direction of rotation of the inner tubular member 150 is upwards in FIGS. 6A-6C and counter clockwise in FIGS. 7A-7C.

As illustrated, the staggered arrangement causes rotation of the inner tubular member 150 to bring one or more inner radial openings into registration with corresponding outer radial openings while one or more other inner radial openings are brought out of registration. The flow rate or magnitude at any one of the fluid streams corresponding to any one of the outer radial openings 144 may increase and decrease in direct relation to increasing or decreasing alignment with the corresponding inner radial openings 154.

Referring to FIGS. 6A and 7A, at a first stage of rotation, streams of the fluid 161 through outer radial openings 144-c and 144-f are at a maximum flow rate or magnitude (represented by bolded arrows in FIG. 7A) due to being fully in registration or circumferential alignment with the corresponding inner radial openings 154-c and 154-f. In this position, the circumferential alignment of the inner radial openings 154-c and 154-f opens a fluid passage so that the inner tubular member 150 permits flow through the outer radial openings 144-c and 144-f. At the same time, the fluid streams through outer radial openings 144-a and 144-d are at a minimum flow rate or magnitude (in this case zero) due to being fully out of registration or circumferential alignment with the corresponding inner radial openings 154-a and 154-d. In this position, the lateral sidewall of the inner tubular member 150 blocks a fluidic passage and restricts flow through the outer radial openings 144-a and 144-d. The fluid streams through outer radial openings 144-b and 144-e are at an intermediate flow rate or magnitude due to being partially in registration or circumferential alignment with the corresponding inner radial openings 154-b and 154-e, causing the fluid passage to be partially open. In this position, the inner tubular member 150 partially obstructs a fluid passage and partially restricts flow through the outer radial openings 144-b and 144-e.

Referring to FIGS. 6B and 7B, after the first stage, the inner tubular member 150 rotates and brings the inner tubular member 150 to a second stage of rotation. As the inner tubular member 150 rotates, the inner radial openings 154-c and 154-f are brought partially out of registration with the corresponding outer radial openings 144-c and 144-f, while at the same time, the inner radial openings 154-b and 154-e are brought into a fully registered state with the corresponding outer radial openings 144-b and 144-e. Also at the same time, the inner radial openings 154-a and 154-d are brought into a partially registered state with the corresponding outer radial openings 144-a and 144-d. In this regard, at the second stage of rotation, streams of the fluid 161 through outer radial openings 144-a, 144-c, 144-d, and 144-f are each at an intermediate flow rate (represented by thin arrows in FIG. 7B) while the outer radial openings 144-b and 144-e are each at a maximum flow rate.

Referring to FIGS. 6C and 7C, after the second stage, the inner tubular member 150 rotates further and brings the inner tubular member 150 to a third stage of rotation. As the inner tubular member 150 continues to rotate, the inner radial openings 154-c and 154-f are brought fully out of registration with the corresponding outer radial openings 144-c and 144-f, while at the same time, the inner radial openings 154-b and 154-e are brought into a partially registered state with the corresponding outer radial openings 144-b and 144-e. Also at the same time, the inner radial openings 154-a and 154-d are brought into a fully registered state with the corresponding outer radial openings 144-a and 144-d. In this regard, at the third stage of rotation, the fluid streams through outer radial openings 144-a and 144-d are at a maximum flow rate, while the fluid streams through the outer radial openings 144-b and 144-e are at an intermediate flow rate and the fluid streams through the outer radial openings 144-c and 144-f are at a minimum flow rate (represented by dotted arrow of FIG. 7C).

FIGS. 6A-6C also depict an example of inner and outer radial openings being formed with different but complementary shapes, which may facilitate a smoother transition for the flow rates through the various openings. According to some embodiments, as shown in FIGS. 6A-6C, the outer radial openings 144 have a convex shape, while the inner radial openings 154 have a complementary concave shape. The convex outer radial openings 144 are depicted with circular or round shapes, while the concave inner radial openings 154 are depicted with inwardly curved semicircular borders at their upper and lower edges, but it will be appreciated that any of a variety of other complementary convex and concave shapes may be used without departing from the principles described herein.

While the exemplary piping manifold 136 is shown with a particular physical arrangement and number of radial openings, it will be appreciated that in general the piping manifold 136 may employ any suitable number and/or physical arrangement of radial openings that can be brought into and out of registration to facilitate the generation of one or more pulsating streams. For example, as few as one inner radial opening and one outer radial opening may be used to facilitate the generation of a single pulsating stream. Alternatively, a plurality of inner radial openings and outer radial openings may be used to facilitate the generation of a plurality of pulsating streams with the same or different phases. The plurality of inner openings and/or the plurality of outer openings may be distributed in any suitable manner at multiple circumferential positions and/or multiple longitudinal positions. In addition, while the example shown includes an equal number of outer radial openings 144 and inner radial openings 154, in various embodiments more or fewer inner radial openings 154 than the outer radial openings 144 may be included. For example, more inner radial openings 154 than outer radial openings 144 may be included to permit slower rotation of the inner tubular member for a given pulsation frequency, or to increase a pulsation frequency for a given rotational speed of the inner tubular member, for example.

The inner tubular member 150 may, for example, be implemented as a continuous tube constructed as a single integral pipe having a smooth exterior surface. Alternatively, the inner tubular member 150 may include a segmented construction and/or include features on an exterior surface thereof to facilitate operation.

Figure 8:
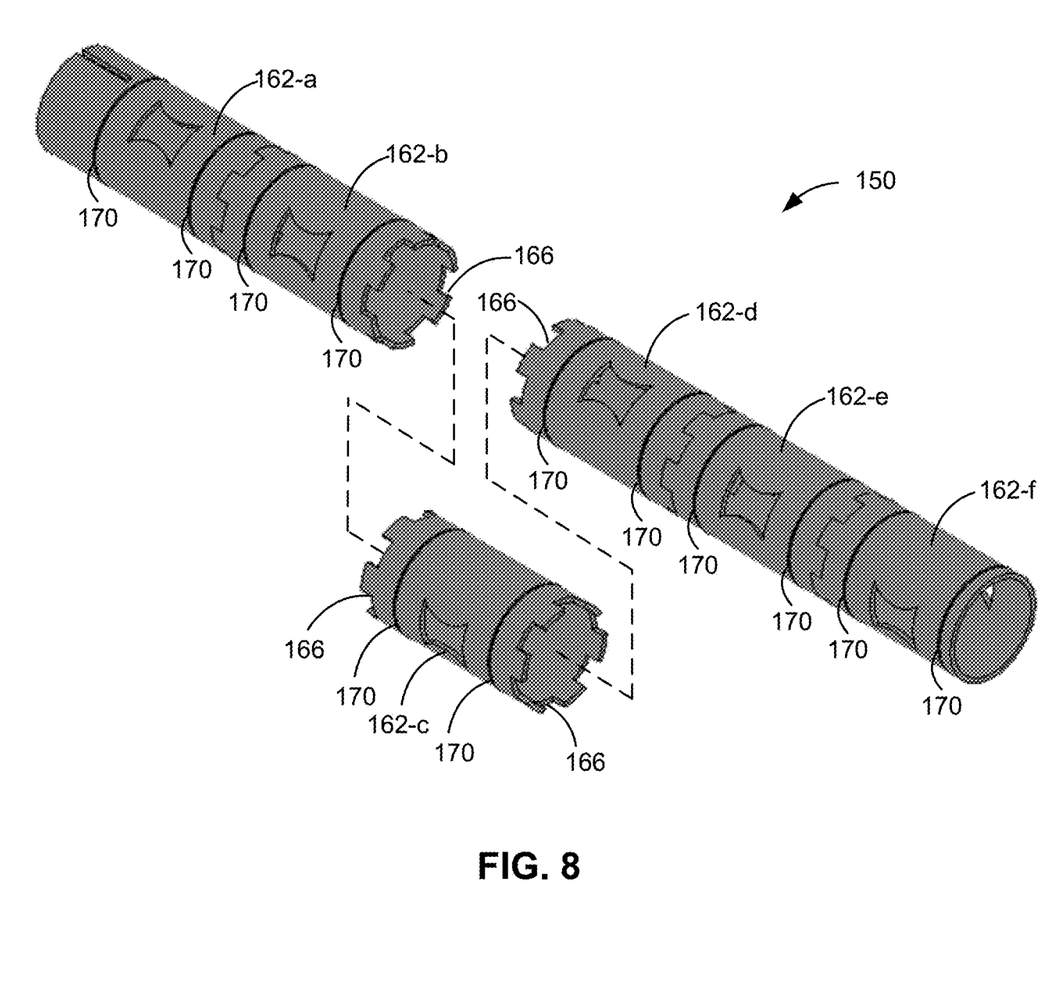
FIG. 8 is a three dimensional view of an example of an inner tubular member having a plurality of articulating segments.

FIG. 8 depicts depict an exemplary embodiment of the inner tubular member 150 that may, for example, be implemented in the piping manifold 136 (FIGS. 3-7). The inner tubular member 150 as shown in FIG. 8 includes a plurality of segments 162 arranged axially end to end and coupled together using joints 166. The use of multiple segments 162 for the inner tubular member 150 may provide a modular design that facilitates manufacturability and/or assembly of the piping manifold (FIGS. 3-7). Additionally or alternatively, the joints 166 may allow for slight relative movement and/or displacement between respective segments to improve manufacturability and/or facilitate rotation of the inner tubular member 150 within the outer tubular member 140 (FIGS. 3-7) at a tight tolerance. For example, the joints 166 may include interleaved or interlocking teeth, as shown in FIG. 8, arranged at the axial ends of the segments 162. A set of teeth on one of the segments 162 may be interleaved with a complementary set of teeth on an adjacent one of the segments 162 to permit slight radial displacement therebetween during assembly and/or during rotational operation of the inner tubular member 150. The complementary teeth may also provide a mechanism that allows rotational force applied to one of the segments 162 to be propagated to an adjacent one of the segments 162 and further downstream through the joints 166, causing the segments 162 to rotate together. For example, a rotational force applied to a first segment 162-a at an axial end of the inner tubular member 150 may be propagated through the teeth to adjacent segment 162-b and further down the length to the inner tubular member 150 to the remaining segments 162 through the various joints and segments. The toothed arrangement may also permit assembly of the multiple segments 162 through sequential insertion of the segments from one axial end of the outer tubular member 140 (FIGS. 3-7).

The inner tubular member 150 is shown with grooves 170, which may be disposed on an exterior surface thereof. Each of the grooves 170 may be configured to accommodate or otherwise facilitate the use of a sealing member, such as an O-ring or a low-friction packing such as polytetrafluoroethylene rope packing, which may form a seal between the inner and outer tubular members to facilitate respective separation of the channels formed by inner and outer radial openings and/or reduce friction between inner tubular member 150 against outer tubular member 140. This may be useful, for example, to reduce or prevent potential cross-talk across the different pulsating flow channels, allowing for more precise control of the flow rate and periodicity at each individual channel.

Figure 9:
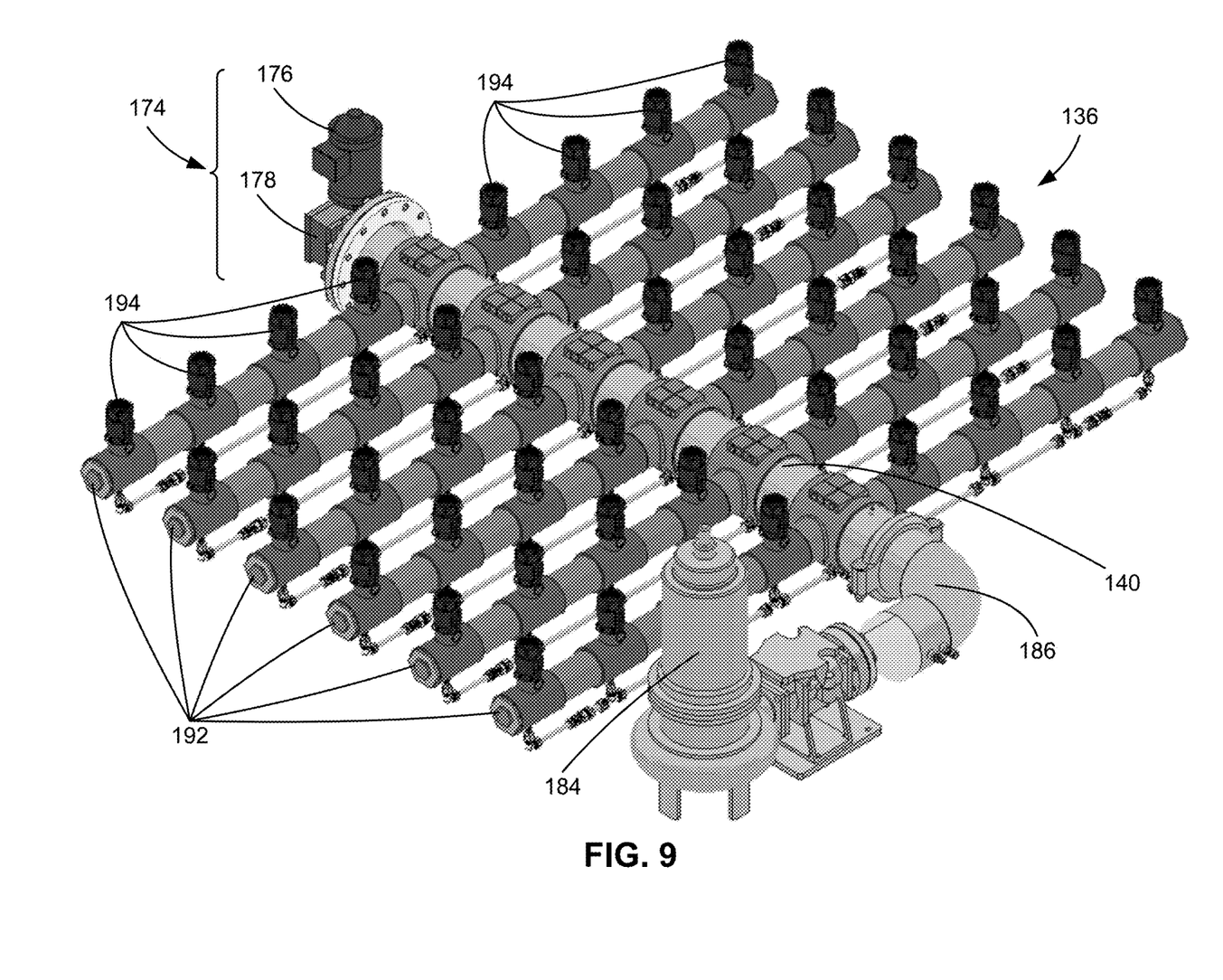
FIG. 9 is an assembled view of an example of a piping system employing a piping manifold.

FIG. 9 is a three-dimensional view of an exemplary piping system employing the piping manifold 136. The piping system is implemented with a drive mechanism 174 coupled to the inner tubular member 150 (FIGS. 3-7) for driving rotation of the inner tubular member within the outer tubular member 140. The drive mechanism includes a motor 176 coupled to an axial end of the inner tubular member through a gearbox 178, which may contain one more gears for converting a rotational speed of the motor to a desired rotational speed of the inner tubular member 150 (FIGS. 3-7). The rotational speed of the inner tubular member may in turn correlate to a pulsation frequency observed at each of the pulsating streams provided by the piping manifold 136.

A pump 184 is coupled to the piping manifold 136 for providing influent fluid from a fluid source (e.g., a wastewater source) to an inner lumen of piping manifold 136. The pump 184 is coupled to an inlet port 156 (FIGS. 3, 6) at one end of the piping manifold 136 opposite to the drive mechanism 174, and the influent fluid is conveyed to the inlet port through intermediate tubing 186 coupled between the pump 184 and the inner tubular member. The pump 184 may provide the influent fluid to the piping manifold at a substantially constant flow rate, which then converts the substantially constant flow into a plurality of pulsating flows or streams via the rotation of the inner pipe.

As shown in FIG. 9, the piping manifold 136 also includes a plurality of branching pipes 192 for conveying fluid flowing out from the piping manifold 136. Each of the branching pipes 192 provides a channel coupled to a respective one of the outer radial openings 144 (FIGS. 3-7) to convey a pulsating stream of fluid flowing out from the respective opening. Each of the branching pipes is in turn coupled to multiple module ports 194, each of which may be coupled to a respective biofilm reactor module or other suitable module for which pulsating flow is desired. Although multiple ports 194 are shown coupled to each of the branching pipes 192, it will be appreciated that any suitable number of one or more ports may be coupled to each of the branching pipes 192 depending on the desired configuration.

Figure 10:
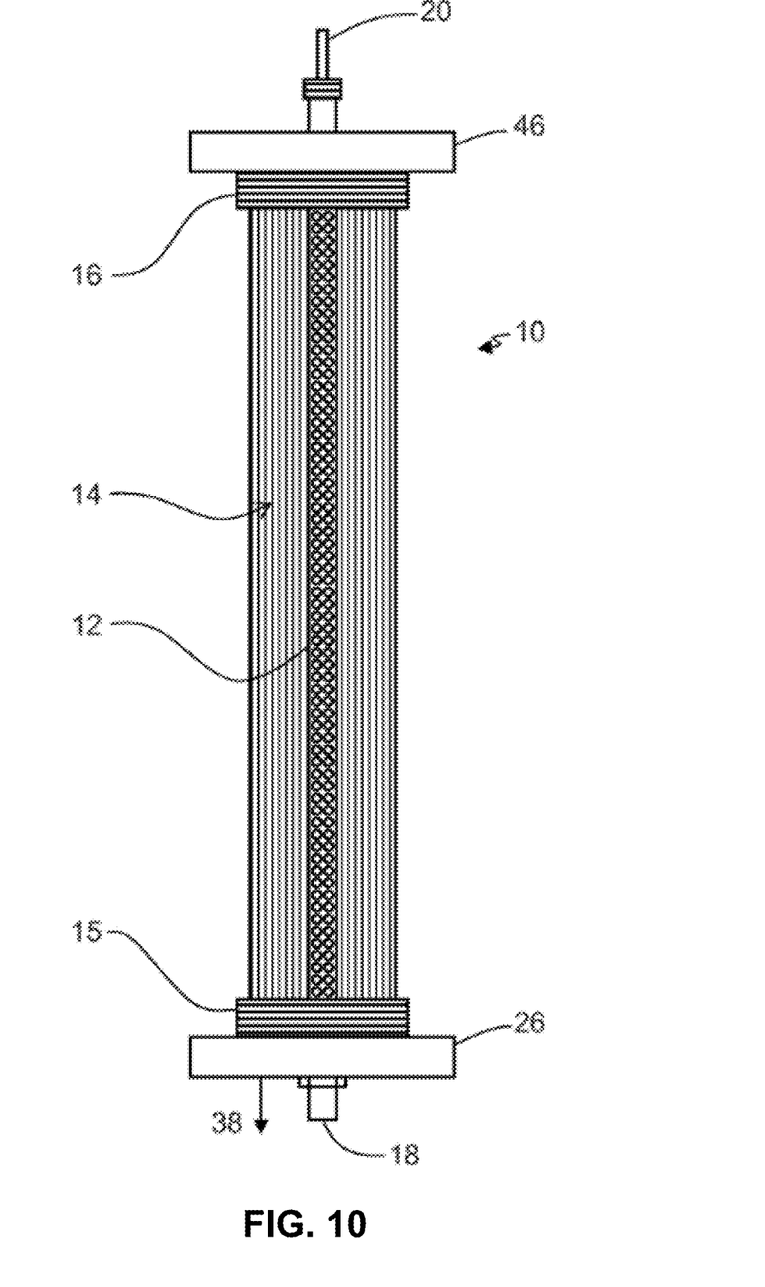
FIG. 10 is a diagram of an example of a biofilm reactor.

FIG. 10 depicts an exemplary biofilm reactor module 10 that may, for example, be implemented in one of the biofilm reactors 101 (FIGS. 1-2) and/or coupled to one of the module ports 194 (FIG. 9) to receive a pulsating influent stream. The biofilm reactor module 10 is implemented as a membrane biofilm reactor (MBfR) employing hollow fibers with gas permeable membranes to deliver reagent gas to the biofilm while also providing a growth surface for the biofilm on an exterior surface of the fibers. As shown in FIG. 10, the MBfR module 10 includes a perforated core tube 12 surrounded by a hollow-fiber membrane sheet assembly 14, which comprises hollow-fiber membrane sheets and may comprise interleaf/spacer material. In constructing the reactor module 10, the membrane sheets (and interleaf/spacer materials) may be wrapped around the perforated core tube 12, and the ends of the sheets and spacers may be potted with a resin. The potted ends can then be machined to open the bore of the fibers, such that a gas may be introduced to the lumens of the fibers, and material may be drained from the lumens of the fibers. The opened ends of the potted fibers are referred to as "tube sheets" 15 and 16.

The core tube 12 is open at one end to influent water at influent port 18. The influent port 18 may, for example, be coupled to the module port 194 (FIG. 9) to receive an influent stream from the piping manifold 136 (FIG. 9). The reactor as shown also contains a gas sparge tube 20, which is in communication with the interior of the core tube 12. The gas sparge tube can be perforated along its length and sealed at one end, or non-perforated and open at each end. One end can also be equipped with a gas diffuser.

A bottom head assembly 26 is designed to seal to the bottom tube sheet 15, and to allow materials, such as inerts, to be drained from the lumens of the membrane hollow fibers, via an inerts collection space. The bottom head assembly, in the embodiment shown, also serves to introduce influent water into the core tube 12.

In the exemplary design shown, the bottom head assembly 26 includes a head constructed of an inert material, such as fiber reinforced plastic, and a cavity to collect material that drains from the lumens of the membrane hollow fibers. The cavity leads to a drain port 38, which itself may lead to a conduit and valve, not shown in the figures.

In the exemplary design shown, the top head assembly 46 is designed to seal to the top tube sheet 16 and core tube 12 and introduce a reagent gas, such as hydrogen or hydrogen/CO2, to the lumens of the hollow fibers. The exemplary top head assembly 46 has a gas inlet which may be in communication with a cavity to distribute the gas or gas mixture to the lumens of the membrane hollow fibers. The top head assembly also accommodates sparge gas tube 20, which extends through the core tube and permits a sparging gas to be introduced into the core tube.

In operation, influent liquid, such as wastewater, enters the perforated center tube and flows through the perforations to contact the hollow-fiber membranes surrounding the tube, upon which a biomass is grown and maintained. The module employs hollow-fiber membranes incorporated into fabric sheets, which are wrapped around the perforated core tube. This design allows a high packing density of hollow fibers. The individual hollow fibers may, for example, have an outer diameter (OD) of 200 to 500 microns and are made from polyester, polypropylene or other polymeric material that can be used as a gas-transfer membrane.

Embodiments disclosed herein include, for example, a piping manifold system and method for providing pulsating flow to a plurality of biofilm reactors. While a detailed description of various implementations has been provided, these are not intended to represent the only implementations in which the subject technology may be practiced. By way of example, while the piping manifold 136 can be suitably implemented to provide a plurality of pulsating streams to a plurality of biofilm reactors, it is noted that the piping manifold 136 may additionally or alternatively be implemented in or applied to any of a variety of systems for which pulsating flow is desired, such as other biological or non-biological systems, other industrial or mechanical systems, and the like.

Various examples of aspects of the disclosure are described below as clauses for convenience. These are provided as examples, and do not limit the subject technology.

Clause 1. A piping manifold for providing pulsating flow, the piping manifold comprising: an outer tubular member extending along a longitudinal axis, the outer tubular member comprising a plurality of outer radial openings; and an inner tubular member positionable within the outer tubular member and rotatable about the longitudinal axis, the inner tubular member comprising a plurality of inner radial openings, an inlet port configured to receive a fluid, and a lumen providing a fluidic pathway between the plurality of inner radial openings and the inlet port, wherein rotation of the inner tubular member about the longitudinal axis is configured to periodically bring the plurality of inner radial openings in and out of registration with the plurality of outer radial openings to provide a plurality of pulsating flows of the fluid out of the outer radial openings.

Clause 2. The piping manifold of Clause 1, wherein the plurality of outer radial openings are disposed in respective longitudinal alignment with the plurality of inner radial openings, and wherein the plurality of outer radial openings are arranged at different circumferential positions relative to outer tubular member than circumferential positions of the plurality of inner radial openings relative to the inner tubular member.

Clause 3. The piping manifold of Clause 1 or 2, wherein the plurality of outer radial openings are disposed in a circumferentially aligned arrangement along the outer tubular member, and wherein the plurality of inner radial openings are disposed in a circumferentially staggered arrangement along the inner tubular member so that the plurality of pulsating flows have a plurality of different phases.

Clause 4. The piping manifold of any of Clauses 1 to 3, wherein the inner tubular member comprises a plurality of segments arranged end to end.

Clause 5. The piping manifold of Clause 4, wherein each one of the segments is coupled to an adjoining one of the segments through a joint that allows relative movement between the one of the segments and the adjoining one of the segments.

Clause 6. The piping manifold of Clause 5, wherein the joint comprises a plurality of teeth at an end of the one of the segments interleaved with a plurality of complementary teeth at an end of the adjoining one of the segments.

Clause 7. The piping manifold of any of Clauses 1 to 6, wherein the plurality of outer radial openings comprise one of a convex and a concave shape, and wherein the plurality of inner radial openings comprise the other of the convex and the concave shape.

Clause 8. The piping manifold of any of Clauses 1 to 7, further comprising: a pump configured to provide a substantially constant flow of the fluid to the inlet port, wherein the rotation of the inner tubular member is configured to convert the substantially constant flow of the fluid into the plurality of pulsating flows of the fluid through the plurality of outer radial openings.

Clause 9. The piping manifold of any of Clauses 1 to 8, further comprising: a drive mechanism comprising a motor and coupled to the inner tubular member at an end of the inner tubular member opposite to inlet port, the drive mechanism being configured to drive the rotation of the inner tubular member about the longitudinal axis.

Clause 10. The piping manifold of any of Clauses 1 to 9, further comprising: a plurality of branching pipes coupled to the plurality of outer radial openings and configured to convey the plurality of pulsating flows to a plurality of biofilm reactors.

Clause 11. A method for providing pulsating flow, the method comprising: rotating an inner tubular member within an outer tubular member about a longitudinal axis, the outer tubular member extending along the longitudinal axis; providing a fluid to a lumen of the inner tubular member through an inlet port of the inner tubular member; periodically bringing a plurality of inner radial openings disposed on the inner tubular member in and out of registration with a plurality of outer radial openings disposed on the outer tubular member via the rotation of the inner tubular member; and periodically permitting and restricting flow of the fluid out of the outer radial openings via the periodic registration of the plurality of inner radial openings with the plurality of outer radial openings.

Clause 12. The method of Clause 11, further comprising: periodically bringing a first one of the inner radial openings in and out of registration with a corresponding first one of the outer radial openings; providing a first pulsating flow of the fluid out of the first one of the outer radial openings via the periodic registration of the first one of the inner radial openings with the first one of the outer radial openings; periodically bringing a second one of the inner radial openings in and out of registration with a corresponding second one of the outer radial openings at different times from the periodic registration of the first one of the inner radial openings with the first one of the outer radial openings; and providing a second pulsating flow of the fluid out of the second one of the outer radial openings with a different phase than the first pulsating flow via the periodic registration of the second one of the inner radial openings with the second one of the outer radial openings.

Clause 13. The method of Clause 11 or 12, further comprising: providing the fluid to the lumen of the inner tubular member by pumping a substantially constant flow of fluid through the inlet port; and converting the substantially constant flow of the fluid into a plurality of pulsating flows of the fluid out of the plurality of outer radial openings via the rotation of the inner tubular member.

Clause 14. The method of Clause 13, further comprising: receiving a pulsating flow of the fluid at a biofilm reactor from one of the outer radial openings; and metabolizing substances in the received pulsating flow of fluid with a biofilm in the biofilm reactor.

Clause 15. A biological system comprising: a plurality of biofilm reactors, each of the biofilm reactors comprising an influent port configured to receive a liquid and a growth surface configured to provide growth of a biofilm of microorganisms capable of metabolizing substances in the liquid; and a piping system coupled to the plurality of biofilm reactors and configured to provide a plurality of pulsating flows of the liquid to the plurality of biofilm reactors.

Clause 16. The biological system of Clause 15, wherein the piping system comprises: an outer tubular member extending along a longitudinal axis, the outer tubular member comprising a plurality of outer radial openings, each of the outer radial openings being coupled to a respective one or more of the biofilm reactors; and an inner tubular member disposed within the outer tubular member and rotatable about the longitudinal axis, the inner tubular member comprising a plurality of inner radial openings, an inlet port configured to receive the liquid, and a lumen providing a fluidic pathway between the plurality of inner radial openings and the inlet port, wherein rotation of the inner tubular member about the longitudinal axis is configured to periodically bring the plurality of inner radial openings in and out of registration with the plurality of outer radial openings to provide the plurality of pulsating flows of the liquid out of the outer radial openings.

Clause 17. The biological system of Clause 16, wherein the plurality of outer radial openings are disposed in a circumferentially aligned arrangement along the outer tubular member, and wherein the plurality of inner radial openings are disposed in a circumferentially staggered arrangement along the inner tubular member so that the plurality of pulsating flows have a plurality of different phases.

Clause 18. The biological system of any of Clauses 16 to 17, wherein the inner tubular member comprises a plurality of segments arranged end to end.

Clause 19. The biological system of any of Clauses 16 to 18, further comprising:

a pump configured to provide a substantially constant flow of the liquid to the inlet port, wherein the rotation of the inner tubular member is configured to convert the substantially constant flow of the liquid into the plurality of pulsating flows of the liquid through the plurality of outer radial openings.

Clause 20. The biological system of any of Clauses 15 to 17, wherein the piping system is configured to provide the plurality of pulsating flows to the plurality of biofilm reactors with a plurality of different phases.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, or unless the context clearly dictates otherwise, it is understood that the specific order or hierarchy of steps, operations, or processes may be performed in a different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A piping manifold for providing pulsating flow, the piping manifold comprising:
    an outer tubular member extending along a longitudinal axis, the outer tubular member comprising a plurality of outer radial openings, the outer radial openings having a first curvature on opposing edges;
    an inner tubular member positionable within the outer tubular member and rotatable about the longitudinal axis, the inner tubular member comprising a plurality of inner radial openings, the inner radial openings having a second curvature on opposing edges, an inlet port configured to receive a fluid, and a lumen providing a fluidic pathway between the plurality of inner radial openings and the inlet port, and a circumferential groove on either side of each inner radial opening of adjacent inner radial openings in an outer surface of the inner tubular member; and
    a low-friction seal disposed along the circumferential groove to separate the fluid from each adjacent inner radial opening and an overlapping outer radial opening, wherein:
        a rotation of the inner tubular member about the longitudinal axis is configured to periodically bring the plurality of inner radial openings in and out of registration with the plurality of outer radial openings to provide a plurality of independent, pulsating flows of the fluid out of the outer radial openings,
        the first curvature and the second curvature comprise complementary convex and concave shapes,
        an edge with the first curvature in the outer tubular member crosses an edge with the second curvature in the inner tubular member, and
        the low-friction seal reduces a rotational friction between the inner tubular member against the outer tubular member.

2. The piping manifold of claim 1, wherein the plurality of outer radial openings are disposed in respective longitudinal alignment with the plurality of inner radial openings, and wherein the plurality of outer radial openings are arranged at different circumferential positions relative to the outer tubular member than circumferential positions of the plurality of inner radial openings relative to the inner tubular member.

3. The piping manifold of claim 1, wherein the plurality of outer radial openings are disposed in a circumferentially aligned arrangement along the outer tubular member, and wherein the plurality of inner radial openings are disposed in a circumferentially staggered arrangement along the inner tubular member so that the plurality of pulsating flows have a plurality of different phases.

4. The piping manifold of claim 1, wherein the inner tubular member comprises multiple segments arranged end to end.

5. The piping manifold of claim 4, wherein each segment is coupled to an adjoining second segment through a joint that allows relative movement between each segment and the adjoining second segment.

6. The piping manifold of claim 5, wherein the joint comprises a plurality of teeth at an end of each segment interleaved with a plurality of complementary teeth at an end of the adjoining second segment.

7. The piping manifold of claim 1, wherein the plurality of outer radial openings comprise a circular shape, and wherein the plurality of inner radial openings comprise inwardly curved semicircular upper and lower edges.

8. The piping manifold of claim 1, further comprising:
    a pump configured to provide a substantially constant flow of the fluid to the inlet port, wherein a rotation of the inner tubular member is configured to convert the substantially constant flow of the fluid into the plurality of pulsating flows of the fluid through the plurality of outer radial openings.

9. The piping manifold of claim 1, further comprising:
    a drive mechanism comprising a motor and coupled to the inner tubular member at an end of the inner tubular member opposite to the inlet port, the drive mechanism being configured to drive a rotation of the inner tubular member about the longitudinal axis.

10. The piping manifold of claim 1, further comprising:
    a plurality of branching pipes coupled to the plurality of outer radial openings and configured to convey the plurality of pulsating flows to a plurality of biofilm reactors.

11. A method for providing pulsating flow, the method comprising:
    rotating an inner tubular member within an outer tubular member about a longitudinal axis, the outer tubular member extending along the longitudinal axis;
    providing a fluid to a lumen of the inner tubular member through an inlet port of the inner tubular member;
    periodically bringing a plurality of inner radial openings disposed on the inner tubular member in and out of registration with a plurality of outer radial openings disposed on the outer tubular member via a rotation of the inner tubular member; and
    periodically permitting and restricting flow of the fluid out of the outer radial openings via a periodic registration of the plurality of inner radial openings with the plurality of outer radial openings, wherein:
        periodically bringing the plurality of inner radial openings disposed on the inner tubular member in and out of registration with the plurality of outer radial openings comprises crossing an edge of at least one outer radial opening having a first curvature with an edge of at least one inner radial opening having a second curvature comprising an opposite convexity to the first curvature, and
        permitting flow of the fluid out of the outer radial openings comprises separating the fluid from each one of adjacent outer radial openings with a low-friction seal disposed along a circumferential groove on either side of each inner radial opening, in an outer surface of the inner tubular member, and wherein the low-friction seal is selected to reduce a rotational friction between the inner tubular member against the outer tubular member.

12. The method of claim 11, further comprising:
periodically bringing a first one of the inner radial openings in and out of registration with a corresponding first one of the outer radial openings;
providing a first pulsating flow of the fluid out of the first one of the outer radial openings via the periodic registration of the first one of the inner radial openings with the first one of the outer radial openings;
periodically bringing a second one of the inner radial openings in and out of registration with a corresponding second one of the outer radial openings at different times from the periodic registration of the first one of the inner radial openings with the first one of the outer radial openings; and
providing a second pulsating flow of the fluid out of the second one of the outer radial openings with a different phase than the first pulsating flow via the periodic registration of the second one of the inner radial openings with the second one of the outer radial openings.

13. The method of claim 11, further comprising:
providing the fluid to the lumen of the inner tubular member by pumping a substantially constant flow of fluid through the inlet port; and
converting the flow of the fluid into a plurality of pulsating flows of the fluid out of the plurality of outer radial openings via the rotation of the inner tubular member.

14. The method of claim 13, further comprising:
receiving a pulsating flow of the fluid at a biofilm reactor from one of the outer radial openings; and
metabolizing substances in the fluid with a biofilm in the biofilm reactor.

15. A biological system comprising:
a plurality of biofilm reactors, each of the biofilm reactors comprising an influent port configured to receive a liquid and a growth surface configured to provide growth of a biofilm of microorganisms capable of metabolizing substances in the liquid; and
a piping system coupled to the plurality of biofilm reactors and configured to provide a plurality of pulsating flows of the liquid to the plurality of biofilm reactors, wherein the piping system comprises:
an outer tubular member extending along a longitudinal axis, the outer tubular member comprising a plurality of outer radial openings, the outer radial openings having a first curvature on opposing edges, each of the outer radial openings being coupled to a respective one or more of the biofilm reactors;
an inner tubular member disposed within the outer tubular member and rotatable about the longitudinal axis, the inner tubular member comprising a plurality of inner radial openings, the inner radial openings having a second curvature on opposing edges, an inlet port configured to receive the liquid, and a lumen providing a fluidic pathway between the plurality of inner radial openings and the inlet port, and a circumferential groove on either side of each inner radial opening of adjacent inner radial openings in an outer surface of the inner tubular member; and
a seal disposed along the circumferential groove to separate a fluid flow from each adjacent inner radial opening and an overlapping outer radial opening, wherein rotation of the inner tubular member about the longitudinal axis is configured to periodically bring the plurality of inner radial openings in and out of registration with the plurality of outer radial openings to provide the plurality of independent, pulsating flows of the liquid out of the outer radial openings, wherein the first curvature and the second curvature comprise complementary convex and concave shapes, and
an edge with the first curvature in the outer tubular member crosses an edge with the second curvature in the inner tubular member.

16. The biological system of claim 15, wherein the plurality of outer radial openings are disposed in a circumferentially aligned arrangement along the outer tubular member, and wherein the plurality of inner radial openings are disposed in a circumferentially staggered arrangement along the inner tubular member so that the plurality of pulsating flows have a plurality of different phases.

17. The biological system of claim 15, wherein the inner tubular member comprises a plurality of segments arranged end to end.

18. The biological system of claim 15, further comprising:
a pump configured to provide a substantially constant flow of the liquid to the inlet port, wherein a rotation of the inner tubular member is configured to convert the substantially constant flow of the liquid into the plurality of pulsating flows of the liquid through the plurality of outer radial openings.

19. The biological system of claim 15, wherein the piping system is configured to provide the plurality of pulsating flows to the plurality of biofilm reactors with a plurality of different phases.

* * * * *